United States Patent [19]

McLelland

[11] 4,394,868
[45] Jul. 26, 1983

[54] HORIZONTAL DISCHARGE ASSEMBLY FOR VERTICALLY ORIENTED FIRE EXTINGUISHER

[75] Inventor: Bruce McLelland, Blue Springs, Mo.

[73] Assignee: Fike Metal Products Corporation, Blue Springs, Mo.

[21] Appl. No.: 211,696

[22] Filed: Dec. 1, 1980

[51] Int. Cl.³ ............................................. F16K 13/04
[52] U.S. Cl. .................................. 137/68 A; 137/587; 220/88 R; 220/88 B; 169/58; 169/66
[58] Field of Search ............................ 137/68 A, 587; 220/88 R, 88 B; 169/58, 66, 68

[56] References Cited

U.S. PATENT DOCUMENTS

| Re. 11,745 | 6/1899 | Friedrich | 137/587 X |
| 2,571,961 | 10/1951 | Smith | 220/88 R |
| 2,797,760 | 7/1957 | Mathisen | 137/68 A |
| 3,648,715 | 3/1972 | Boothe | 137/68 A X |
| 4,084,602 | 4/1978 | Cook | 137/68 A |

FOREIGN PATENT DOCUMENTS 985651  3/1965  United Kingdom ............ 137/68 A

*Primary Examiner*—Harold W. Weakley
*Attorney, Agent, or Firm*—Schmidt, Johnson, Hovey & Williams

[57] ABSTRACT

A high speed, horizontal discharge hazard suppression device for preventing fire and explosions in confined zones such as dust collectors is provided which includes a tank having a generally arcuate tubular elbow extending from the underside thereof, and a selectively operable rupture disc mounted at the end of the elbow remote from the tank. The tank and elbow contain a desired fluid suppressant, and the device is mounted in an upright relation such that the suppressant bears directly against the rupture disc. The device serves to deliver suppressant in reduced time as compared with prior horizontal discharge units, and completely eliminates the costly and inefficient delivery pipe usually provided downstream of the rupture disc.

6 Claims, 5 Drawing Figures

U.S. Patent        Jul. 26, 1983        4,394,868
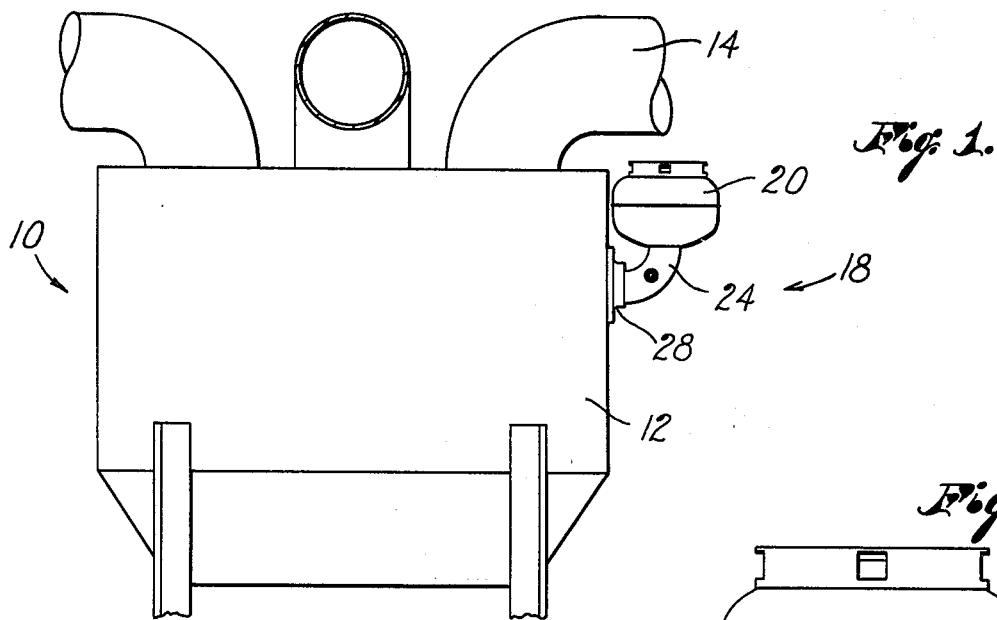
Fig. 1.
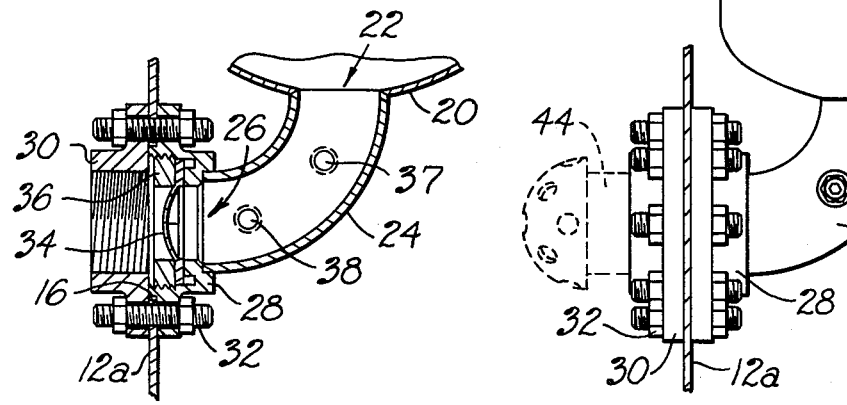 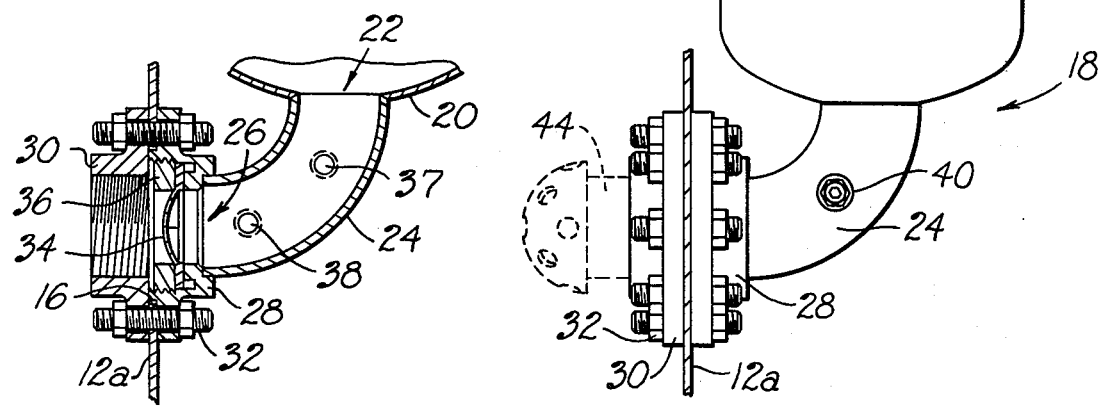
Fig. 3.
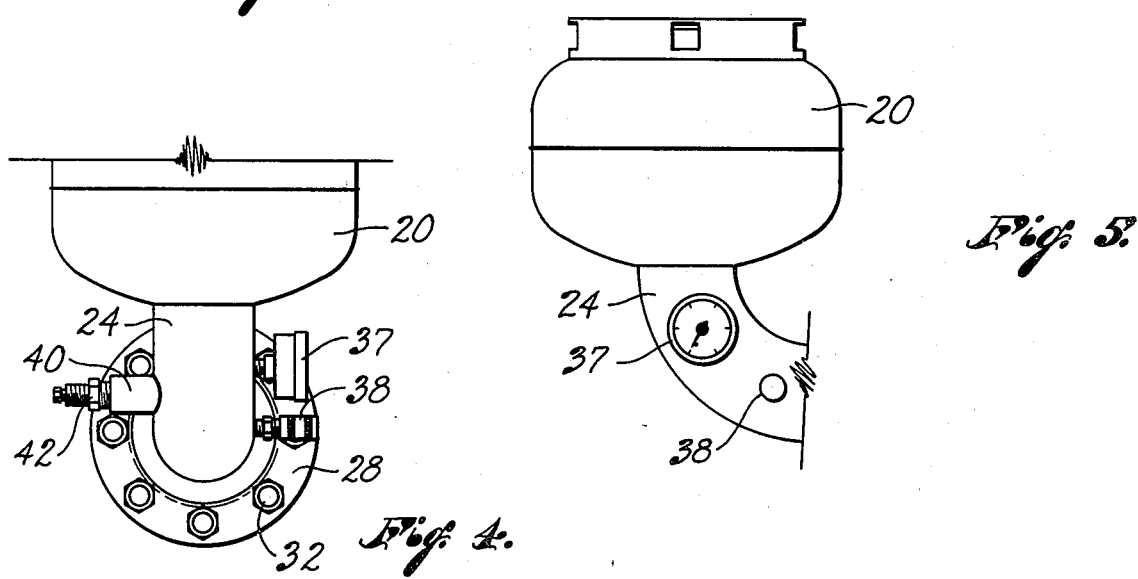
Fig. 5.
Fig. 4.

HORIZONTAL DISCHARGE ASSEMBLY FOR VERTICALLY ORIENTED FIRE EXTINGUISHER

BACKGROUND OF THE INVENTION

1. Field of the Invention

The present invention is concerned with an improved hazard suppression assembly of the type including a tank containing a pressurized hazard suppression material such as a fire extinguishant. More particularly, it is concerned with such an assembly which is especially designed for extremely rapid, horizontal discharge of material into a zone to be protected, and with complete elimination of large, bulky delivery pipes usually associated with equipment of this type. The invention finds utility in suppressing explosions in dust environments and in a wide variety of other contexts, such as in vapor or liquid processes.

Actual tests confirm that effective discharge time of the assembly in accordance with the present invention is measurably faster than that of prior conventional devices.

2. Description of the Prior Art

In recent years, a number of government regulations have been promulgated which severely restrict the amount of dust and the like which can be lawfully emitted into the atmosphere. As a consequence of these regulations, there has been a large increase in the use of dust collecting equipment, such as cyclone-type separators and bag houses. Such dust collection equipment may be employed to collect mill dust, as an adjunct to foundry operations, and in a wide variety of other industrial applications where dust is a potential problem.

Of course, the increase in the use of bag houses and other dust collection equipment has correspondingly increased the risk of fire and/or explosion inherent in dust collection. Accordingly, users of such equipment have resorted to a number of expedients in order to prevent catastrophic fires and explosions.

One such unit in prior use is a vertical discharge tank normally filled with a fire suppressant such as Halon 1301. A short outlet pipe is affixed to the tank, and is equipped with a normally flow-blocking, selectively rupturable disc. An appropriate sensor is operatively coupled with an explosive device positioned within the outlet pipe in order to rupture the disc when hazardous conditions are sensed.

While devices of this type have proven to be extremely effective when vertical discharge is required, attempts at using the same in the context of a horizontal discharge device have proven less than optimum. Normally, in order to obtain horizontal discharge, an elongated, arcuate elbow is operatively coupled to the tank discharge pipe downstream of the rupture disc. After the rupture disc is activated, the extinguishant must fill the large volume of the downstream elbow and then be dispersed through a nozzle. This filling of the elbow with extinguishant reduces the accumulated agent dispersal pressure, reduces agent dispersal velocity, and wastes valuable time which is needed for optimum explosion suppression. In addition, the added weight of the downstream elbow requires considerable bracing to be added to the overall structure, and the cost of the latter is therefore significantly increased.

SUMMARY OF THE INVENTION

The present invention overcomes the problems noted above, and provides a greatly improved horizontal discharge hazard suppression assembly which is characterized by extremely rapid discharge and dispersal of the extinguishant or other hazard suppression material, coupled with a reduction in cost of the device as compared with prior horizontal discharge units.

Broadly speaking, the assembly of the present invention includes a tank for holding a pressurized hazard suppression material which includes a lower outlet, along with an elongated, generally arcuate tubular elbow secured to the tank outlet and in free, open communication with the interior of the tank. A rupture disc is operatively mounted in closing relationship to the tubular elbow adjacent the outlet end of the elbow remote from the tank. The overall assembly is mounted in an upright orientation with the outlet end of the elbow being disposed generally horizontally, such that the extinguishant or the like is disposed within the tank and elbow, and bears directly against the rupture disc. An explosive charge or other means for selectively rupturing the disc is also provided, such that, when the disc is ruptured the suppressant material flows directly from the outlet end of the elbow and into the zone or structure being protected.

In preferred forms, the elbow extends through an arc of about 90 degrees, and in optional forms an apertured, material-dispersing head can be provided in order to spread the flow of material as it exits from the discharge elbow.

BRIEF DESCRIPTION OF THE DRAWINGS

FIG. 1 is a side view of a dust-collecting bag house, with a horizontal discharge hazard suppression assembly in accordance with the present invention mounted thereon;

FIG. 2 is a side elevational view illustrating the preferred assembly in accordance with the invention, and with an optional material-dispersing head depicted in phantom;

FIG. 3 is a fragmentary, vertical sectional view illustrating the internal construction of the tank, elbow, and rupture disc associated with the assembly of the invention;

FIG. 4 is a fragmentary end view of the assembly; and

FIG. 5 is a fragmentary side elevational view of the assembly, illustrating the side thereof opposite to that depicted in FIG. 2.

DESCRIPTION OF THE PREFERRED EMBODIMENT

Turning now to the drawing, FIG. 1 illustrates a conventional dust collector 10 in the form of a chamber defined by sidewalls 12 and ducts 14. One of the sidewalls 12a is apertured as at 16 (see FIG. 3), and a horizontal discharge hazard suppression assembly 18 in accordance with the invention is operatively secured to wall 12a at the region of aperture 16.

The assembly 18 includes a metallic tank 20 for holding a pressurized hazard suppression material such as a fire extinguishant. The tank 20 has a lower outlet 22, and an elongated, generally arcuate tubular elbow 24 is secured to the underside of tank 20 at outlet 22, such that the elbow 24 and tank 20 are in open communication. As illustrated, the elbow extends through an arc of about 90 degrees, and the outlet end 26 of the elbow remote from tank 20 is oriented generally horizontally.

An internally threaded flange 28 is secured to end 26 of elbow 24, and abuts the outer surface of wall 12a. An inner, mating flange 30 provided with a threaded internal bore is positioned against the inner face of wall 12a as best seen in FIGS. 2 and 3. Appropriate mounting bores in the flanges 28 and 30, and through wall 12a, are provided, with appropriate connectors 32 extending through the bores to secure the flanges, and thereby the elbow 24 and tank 20, to sidewall 12a. It will be seen that the internal bores of the flanges 28, 30, are coaxial with aperture 16 in wall 12a, so that a flow path through wall 12a is established.

The overall assembly 18 further includes a selectively operable, rupturable disc 34, along with a mounting collar 36 which is threaded into the bore of flange 28 are depicted. It will therefore be appreciated that disc 34 is mounted adjacent the outlet end of the elbow remote from tank 20, and in closing relationship to the elbow and flow path. Moreover, it will be realized that, by virtue of the upright orientation of the assembly when mounted on wall 12a, the fluid suppressant within tank 20 and elbow 24 bears directly against the inner concave surface of the disc 34 at all times.

Referring to FIGS. 4 and 5, it will be seen that a pressure gauge 37 extends through the defining wall of elbow 24, along with a filling valve 38. In addition, a tubular, outwardly extending sleeve 40 is secured to elbow 24. The sleeve 40 removably receives a conventional explosive device 42. As is usual in units of this type, the explosive device 42 is designed to operate when hazardous conditions are sensed within dust collector 10. To this end, the device is operably coupled by means (not shown) to a sensor disposed within the dust collector so that, upon the occurrence of hazardous conditions such as sparks or combustion within the dust collector, the device 42 is actuated.

In certain instances it may be desirable to provide a material-dispensing head associated with overall assembly 18. When this is desired, apertured head 44 can be screwed into the bore of flange 30, as illustrated in phantom in FIG. 2.

When a preselected hazardous condition is sensed within dust collector 10, an appropriate signal is sent which activates explosive device 42. This in turn serves to rupture disc 34 in the well known manner in order to permit the pressurized suppressant within tank 20 and elbow 24 to flow directly into the interior of dust collector 10. By virtue of the fact that the suppressant bears directly against the disc 34 prior to rupturing thereof, it will be appreciated that the material flows virtually instantaneously from assembly 18 into dust collector 10; as such, no valuable time is lost in suppressing the hazard, as is the case with many conventional units.

Having thus described the invention, what is claimed as new and desired to be secured by Letters Patent is:

1. A horizontal discharge hazard suppression assembly, comprising:
    a tank for holding a pressurized hazard suppression material and having a lower outlet;
    an elongated, gently arcuate tubular elbow operatively secured to said tank outlet and in open communication with the interior of said tank;
    a selectively operable, rupturable disc;
    means mounting said disc in closing relationship to said elbow and adjacent the outlet end of said elbow remote from said tank;
    structure for mounting said tank and elbow adjacent a zone to be protected from hazard, with said tank being generally upright and said outlet end of said elbow being oriented generally horizontally, such that said material is disposed within said tank and elbow and bears directly against said disc; and
    means for rupturing said disc in response to the presence of a preselected hazardous condition within said zone such that said material flows directly from said outlet end of said elbow into said zone.

2. The assembly as set forth in claim 1, said elbow extending through an arc of about 90 degrees.

3. The assembly as set forth in claim 1, said disc rupturing means comprising an explosive element operatively coupled and extending into the interior of said elbow.

4. The assembly as set forth in claim 1, said disc mounting means including structure for supporting said disc in spaced relationship to said outlet end of said elbow.

5. The assembly as set forth in claim 1, including an apertured material-dispersing head operatively coupled proximal to said outlet end of said elbow and extending into said zone.

6. The assembly as set forth in claim 1, said mounting structure for said tank and elbow comprising flange means secured to said elbow, and connector means for securing said flange means to a defining wall of said zone, said wall being apertured for flow of said material from said elbow and into said zone.

* * * * *